United States Patent
Chung et al.

(10) Patent No.: US 12,013,938 B2
(45) Date of Patent: Jun. 18, 2024

(54) APPARATUS FOR GENERATING A SIGNATURE THAT REFLECTS THE SIMILARITY OF A MALWARE DETECTION AND CLASSIFICATION SYSTEM BASED ON DEEP NEURAL NETWORKS, METHOD THEREFOR, AND COMPUTER-READABLE RECORDING MEDIUM RECORDED WITH A PROGRAM FOR PERFORMING THE METHOD

(71) Applicant: ESTsecurity Corp., Seoul (KR)

(72) Inventors: Ui Jung Chung, Seoul (KR); Won Kyung Lee, Seoul (KR); Hyeong Jin Byeon, Seoul (KR)

(73) Assignee: ESTSECURITY CORP., Seoul (KR)

( * ) Notice: Subject to any disclaimer, the term of this patent is extended or adjusted under 35 U.S.C. 154(b) by 353 days.

(21) Appl. No.: 17/565,954

(22) Filed: Dec. 30, 2021

(65) Prior Publication Data
US 2022/0207141 A1 Jun. 30, 2022

(30) Foreign Application Priority Data
Dec. 31, 2020 (KR) .................. 10-2020-0189136

(51) Int. Cl.
*G06F 21/56* (2013.01)
*G06F 18/22* (2023.01)
*G06N 3/047* (2023.01)

(52) U.S. Cl.
CPC ............ *G06F 21/564* (2013.01); *G06F 18/22* (2023.01); *G06N 3/047* (2023.01)

(58) Field of Classification Search
CPC ........ G06F 21/564; G06F 18/22; G06N 3/047
(Continued)

(56) References Cited

U.S. PATENT DOCUMENTS 11,108,809 B2 * 8/2021 Johns .................... H04L 63/145
2008/0016339 A1 * 1/2008 Shukla .................... G06F 21/54
713/164
(Continued)

FOREIGN PATENT DOCUMENTS

CN 105354496 A * 2/2016
CN 105718795 A * 6/2016 ........... G06F 21/552
(Continued)

OTHER PUBLICATIONS

Sahu et al., "Improved Malware Detection Technique Using Ensemble Based Classifier and Graph Theory," 2015 IEEE International Conference on Computational Intelligence & Communication Technology, Ghaziabad, India, 2015, pp. 150-154, doi: 10.1109/CICT. 2015.147. (Year: 2015).*
Zolotukhin et al., "Support vector machine integrated with game-theoretic approach and genetic algorithm for the detection and classification of malware," 2013 IEEE Globecom Workshops (GC Wkshps), Atlanta, GA, USA, 2013, pp. 211-216, doi: 10.1109/GLOCOMW.2013.6824988. (Year: 2013).*
(Continued)

*Primary Examiner* — Peter C Shaw
(74) *Attorney, Agent, or Firm* — NKL LAW; Jae Youn Kim

(57) ABSTRACT

An apparatus for generating a signature that reflects the similarity of a malware detection and classification system of the present invention includes a pre-processing unit configured to generate an input vector from input information, a classification unit configured to calculate a latent vector which indicates the similarity between at least one malware classification and the input vector by performing a plurality of computations to which learned weights of a plurality of layers are applied on the input vector through a deep neural network model, and a signature generation unit configured to generate a signature of the malware in a form of a binary vector by quantizing the latent vector.

9 Claims, 10 Drawing Sheets

(58) Field of Classification Search
USPC .......................................................... 726/24
See application file for complete search history.

(56) References Cited

U.S. PATENT DOCUMENTS

| | | | | |
|---|---|---|---|---|
| 2011/0219449 | A1* | 9/2011 | St. Neitzel | G06F 21/53 |
| | | | | 726/23 |
| 2017/0085585 | A1* | 3/2017 | Morkovský | G06F 21/316 |
| 2020/0233962 | A1* | 7/2020 | Chantry | G06F 8/311 |
| 2021/0258791 | A1* | 8/2021 | Jochem Sanz | H04W 12/66 |
| 2022/0060492 | A1* | 2/2022 | Giaconi | H04L 63/0245 |
| 2022/0147815 | A1* | 5/2022 | Conwell | H04L 63/1416 |
| 2022/0182397 | A1* | 6/2022 | Romero Zambrano | |
| | | | | H04L 63/1416 |

FOREIGN PATENT DOCUMENTS

| | | | | | |
|---|---|---|---|---|---|
| CN | 108280350 | A | * | 7/2018 | ........... G06F 21/563 |
| CN | 108334776 | A | * | 7/2018 | ........... G06F 21/563 |
| CN | 111770053 | A | * | 10/2020 | ........... G06F 21/563 |
| KR | 2015-0133498 | A | | 11/2015 | |

OTHER PUBLICATIONS

Chandrakala et al., "Detection and Classification of Malware," 2021 International Conference on Advancements in Electrical, Electronics, Communication, Computing and Automation (ICAECA), Coimbatore, India, 2021, pp. 1-3, doi: 10.1109/ICAECA52838. 2021.9675792. (Year: 2021).*

Lin et al., "Malware Detection and Classification by Graph Neural Network," 2023 IEEE 5th Eurasia Conference on IOT, Communication and Engineering (ECICE), Yunlin, Taiwan, 2023, pp. 623-625, doi: 10.1109/ECICE59523.2023.10383172. (Year: 2023).*

Agarkar et al., "Malware Detection & Classification using Machine Learning," 2020 IEEE International Symposium on Sustainable Energy, Signal Processing and Cyber Security (iSSSC), Gunupur Odisha, India, 2020, pp. 1-6, doi: 10.1109/iSSSC50941.2020. 9358835. (Year: 2020).*

Bokolo et al., "A Comparison Study to Detect Malware using Deep Learning and Machine learning Techniques," 2023 IEEE 6th International Conference on Big Data and Artificial Intelligence (BDAI), Jiaxing, China, 2023, pp. 1-6, doi: 10.1109/BDAI59165.2023. 10256957. (Year: 2023).*

* cited by examiner

APPARATUS FOR GENERATING A SIGNATURE THAT REFLECTS THE SIMILARITY OF A MALWARE DETECTION AND CLASSIFICATION SYSTEM BASED ON DEEP NEURAL NETWORKS, METHOD THEREFOR, AND COMPUTER-READABLE RECORDING MEDIUM RECORDED WITH A PROGRAM FOR PERFORMING THE METHOD

CROSS REFERENCE TO RELATED APPLICATIONS

This application claims the priority benefit of Korean Patent Application No. 10-2020-0189136 filed on Dec. 31, 2020 the entirety of which is incorporated by reference herein.

BACKGROUND OF THE INVENTION

1. Field of the Invention

The present invention relates to a signature generation technology, and more particularly, to an apparatus for generating a signature that reflects the similarity of a malware detection and classification system based on deep neural networks, a method therefor, and a computer-readable recording medium recorded with a program for performing the method.

2. Description of the Related Art

Numerous variants of malwares are generated every day, and methods for generating variants of malwares that avoid existing detection methods have been developing. Thereby, not only an existing method for generating a signature based on a cryptographic hash function but also a method for generating a signature which is robust to a regional change in a file, represented by locality-sensitive hashing (LSH), are being invalidated. To solve such a problem, a method for generating a signature, which is capable of responding to polymorphic characteristics of the variants of malwares, is required.

PRIOR ART DOCUMENT

Patent Document (Patent Document 1) Korean Patent Laid-Open Publication No. 2015-0133498 (published on Nov. 30, 2015) (Title: Signature generation apparatus and method for generating a signature of a program, malware detection apparatus and method for detecting malware of the signature)

SUMMARY OF THE INVENTION

In consideration of the above-mentioned circumstances, it an object of the present invention to provide an apparatus for generating a signature that reflects the similarity of a malware detection and classification system based on deep neural networks, a method therefor, and a computer-readable recording medium recorded with a program for performing the method.

To achieve the above-described object, according to an aspect of the present invention, there is provided an apparatus for generating a signature that reflects the similarity of a malware detection and classification system, the apparatus including: a pre-processing unit configured to generate an input vector from input information which is information on a file whose malware classification is unknown; a classification unit configured to calculate a latent vector which indicates the similarity between at least one malware classification and the input vector by performing a plurality of computations to which learned weights of a plurality of layers are applied on the input vector through a deep neural network model; and a signature generation unit configured to generate a signature of the malware in a form of a binary vector by quantizing the latent vector.

The apparatus may further include a classification learning unit configured to: set an expected value for a learning input vector whose malware classification is known according to the known malware classification; input the learning input vector into the deep neural network model; and when the deep neural network model calculates an output value which indicates the similarity between at least one malware classification and the input vector by performing a plurality of computations to which unlearned weights are applied on the learning input vector, correct the weights of the deep neural network model so that a difference between the calculated output value and the expected value set according to the known malware classification is minimized.

The apparatus may further include a distance function learning unit configured to: set a center vector of the known malware classification as an expected value for a learning input vector whose malware classification is known; input the learning input vector into the deep neural network model; and when the deep neural network model calculates a latent vector which indicates the similarity between at least one malware classification and the input vector by performing a plurality of computations to which unlearned weights are applied on the learning input vector, correct the weights of the deep neural network model so that a distance between the calculated latent vector and the center vector of the known malware classification is minimized.

The distance function learning unit may correct the weights of the deep neural network model, so that a computation result value of an objective function is minimized as shown in Equation 1 below:

$$L_c = \lambda \frac{1}{N} \sum_i (c_{yi} - e_i)^2 \qquad \text{[Equation 1]}$$

wherein, Lc is an objective function which allows the distance between the latent vector and the center vector to be minimized, λ is a ratio in which the computation result value of the objective function of the distance function learning unit is reflected in weight learning of the deep neural network model, N is the number of learning input vectors, i denotes the i-th among first to N-th learning input vectors, $C_{yi}$ is a center vector of the malware classification of the i-th learning input vector, and $e_i$ is a latent vector of the i-th learning input vector.

The apparatus may further include a binarization learning unit configured to: set a value obtained by adding a separation value to a reference value or a value obtained by subtracting the separation value from the reference value as an expected value for a learning input vector whose malware classification is known; input the learning input vector into the deep neural network model; and when the deep neural network model calculates a latent vector which indicates the similarity between at least one malware classification and the input vector by performing a plurality of computations to which unlearned weights are applied on the learning input vector, correct the weights of the deep neural network model so that a difference between a value of each element of the calculated latent vector and the value obtained by adding the separation value to the reference value or the value obtained by subtracting the separation value from the reference value is minimized.

The binarization learning unit may correct the weights of the deep neural network model, so that a computation result value of an objective function is minimized as shown in Equation 2 below:

$$L_b = \eta \sum_i^N \sum_j^M ||b_{ij} - k_1| - k_2| \qquad \text{[Equation 2]}$$

wherein, Lb is an objective function which allows a value of the latent vector to be binarized (to be brought close to $k_1+k_2$ or $k_1-k_2$), η is a ratio in which the computation result value of the objective function is reflected in weight learning, N is the number of learning input vectors, M is a length of the latent vector, i denotes the i-th among first to N-th learning input vectors, j denotes the j-th element among first to M-th elements of the latent vector, $b_{ij}$ is a value of the j-th element of the latent vector of the i-th learning input vector, $k_1$ is the reference value, and $k_2$ is the separation value.

In addition, according to another aspect of the present invention, there is provided a method for generating a signature that reflects the similarity of a malware detection and classification system, the method including the steps of: generating, by a pre-processing unit, an input vector from input information which is information on a file whose malware classification is unknown; calculating, by a classification unit, a latent vector which indicates the similarity between at least one malware classification and the input vector by performing a plurality of computations to which learned weights of a plurality of layers are applied on the input vector through a deep neural network model; and generating, by a signature generation unit, a signature vector of a malware in a form of a binary vector by quantizing the latent vector.

The method, before the step of generating the input vector, may further include a classification learning step including the steps of: generating, by the pre-processing unit, a learning input vector whose malware classification is known; setting, by a classification learning unit, an expected value for the learning input vector according to the known malware classification; inputting, by the classification learning unit, the learning input vector into the deep neural network model; calculating, by the deep neural network model of the classification unit, an output value which indicates the similarity between at least one malware classification and the input vector by performing a plurality of computations to which unlearned weights are applied on the learning input vector; and correcting, by the classification learning unit, the weights of the deep neural network model so that a difference between the calculated output value and the expected value set according to the known malware classification is minimized.

The method, before the step of generating the input vector, and after the classification learning step, may further include a distance function learning step including the steps of: setting, by a distance function learning unit, a center vector of the known malware classification as an expected value for a learning input vector whose malware classification is known; inputting, by the distance function learning unit, the learning input vector into the deep neural network model; calculating, by the deep neural network model of the classification unit, a latent vector which indicates the similarity between at least one malware classification and the input vector by performing a plurality of computations to which unlearned weights are applied on the learning input vector; and correcting, by the distance function learning unit, the weights of the deep neural network model so that a distance between the calculated latent vector and the center vector of the known malware classification in a vector space is minimized.

The distance function learning step may include: correcting, by the distance function learning unit, the weights of the deep neural network model, so that a computation result value of an objective function is minimized as shown in Equation 1 below:

$$L_c = \lambda \frac{1}{N} \sum_i (c_{yi} - e_i)^2 \qquad \text{[Equation 1]}$$

wherein, Lc is an objective function which allows the distance between the latent vector and the center vector to be minimized, λ is a ratio in which the computation result value of the objective function of the distance function learning unit is reflected in weight learning of the deep neural network model, N is the number of learning input vectors, i denotes the i-th among first to N-th learning input vectors, $C_{yi}$ is a center vector of the malware classification of the i-th learning input vector, and $e_i$ is a latent vector of the i-th learning input vector.

The method, before the step of generating the input vector, and after the distance function learning step, may further include a binarization learning step including the septs of: setting, by a binarization learning unit, a value obtained by adding a separation value to a reference value or a value obtained by subtracting the separation value from the reference value as an expected value for a learning input vector whose malware classification is known; inputting, by the binarization learning unit, the learning input vector into the deep neural network model; calculating, by the deep neural network model of the classification unit, a latent vector which indicates the similarity between at least one malware classification and the input vector by performing a plurality of computations to which unlearned weights are applied on the learning input vector; and correcting, by the binarization learning unit, the weights of the deep neural network model so that a difference between a value of each element of the calculated latent vector and the value obtained by adding the separation value to the reference value or the value obtained by subtracting the separation value from the reference value is minimized.

The binarization learning step may include: correcting, by the binarization learning unit, the weights of the deep neural network model, so that a computation result value of an objective function is minimized as shown in Equation 2 below:

$$L_b = \eta \sum_i^N \sum_j^M ||b_{ij} - k_1| - k_2| \qquad \text{[Equation 2]}$$

wherein, Lb is an objective function which allows a value of the latent vector to be binarized (to be brought close to $k_1+k_2$ or $k_1-k_2$), $\eta$ is a ratio in which the computation result value of the objective function is reflected in weight learning, N is the number of learning input vectors, M is a length of the latent vector, i denotes the i-th among first to N-th learning input vectors, j denotes the j-th element among first to M-th elements of the latent vector, $b_{ij}$ is a value of the j-th element of the latent vector of the i-th learning input vector, $k_1$ is the reference value, and $k_2$ is the separation value.

Further, according to another aspect of the present invention, there is provided a computer-readable recording medium in which a program for performing the method for generating a signature according to the above-described embodiments of the present invention is recorded.

According to the present invention, through the signature of the malware generated by the deep neural network model which is subjected to learning to reflect the similarity of the malware detection and classification system from various characteristics of the malware, it is possible to detect variants of malware having polymorphic characteristics, which are weaknesses of the existing method, and evaluate the similarity between malwares, while maintaining advantages of concise expression for a static file provided by the existing signature method.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
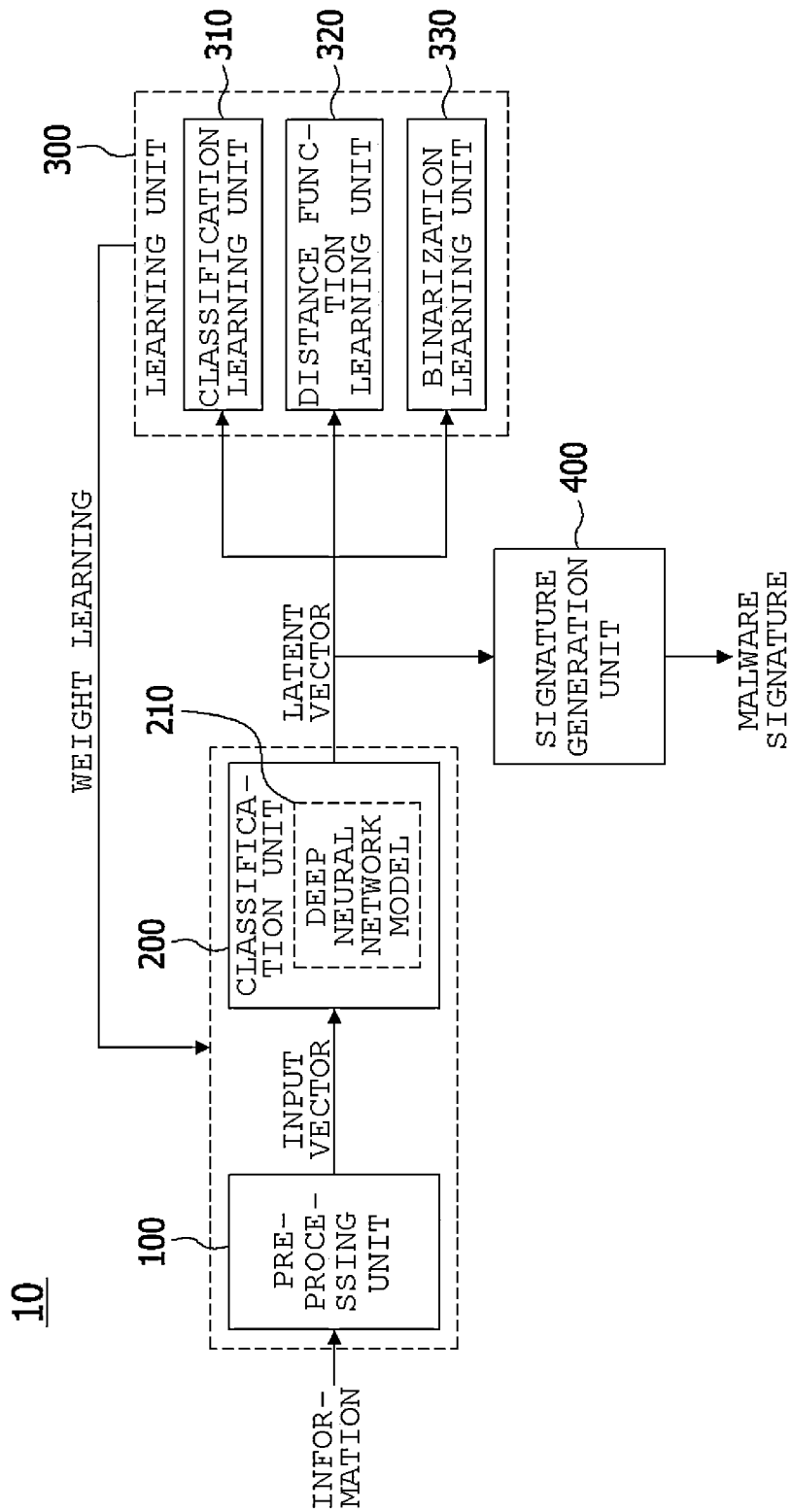
FIG. 1 is a block diagram for describing a configuration of an apparatus for generating a signature that reflects the similarity of a deep neural network-based malware detection and classification system according to an embodiment of the present invention.
Figure 2:
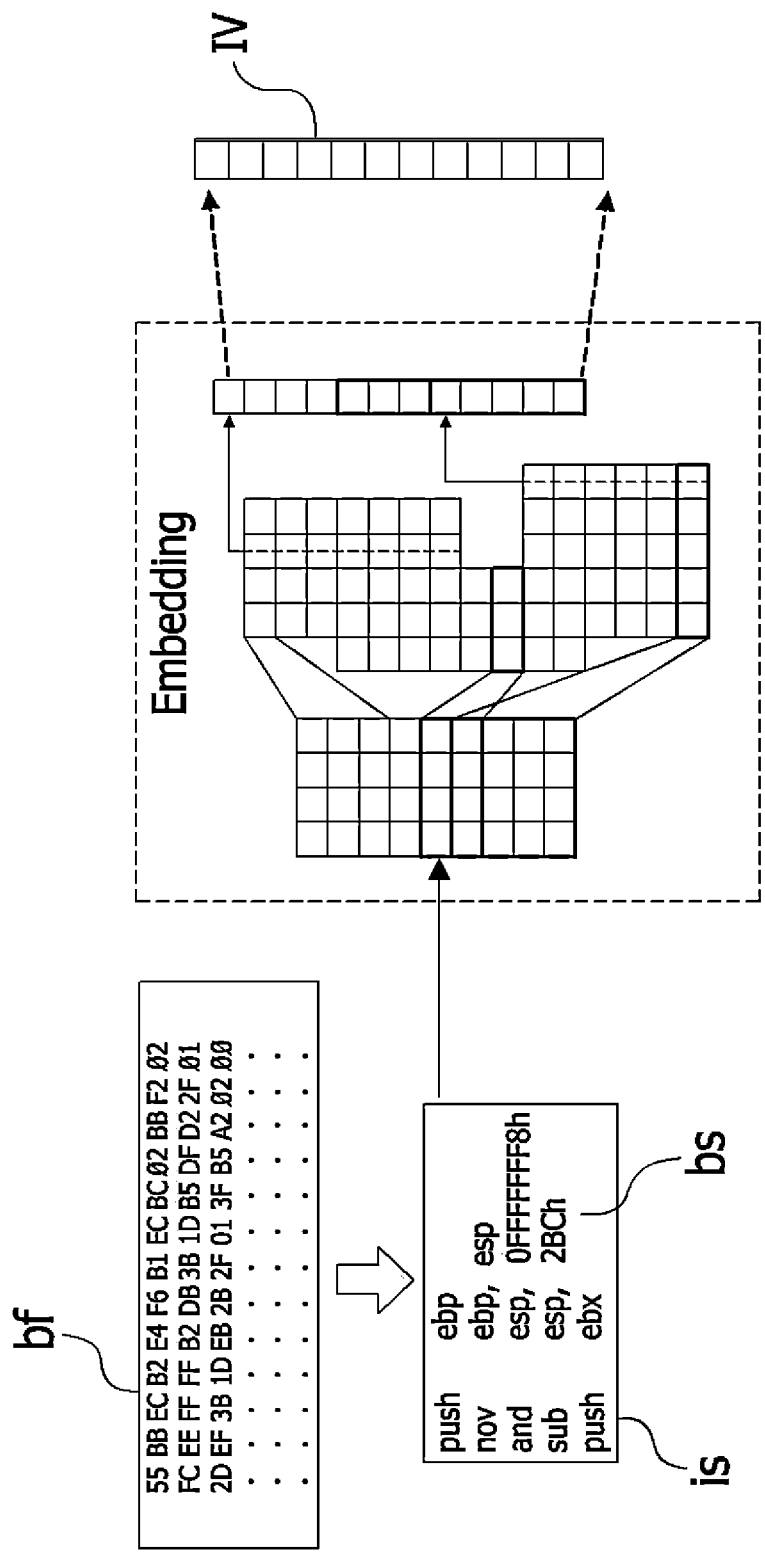
FIGS. 2 to 5 are views for describing a method for generating an input vector by embedding input information according to an embodiment of the present invention.

Prior to the detailed description of the present invention, the terms and words used in the present disclosure and claims, which will be described below, should not be construed as limited to a conventional or lexical meaning, and should be understood as appropriate notions by the inventor based on that he/she is able to define terms to describe his/her invention in the best way to be seen by others. Accordingly, embodiments described in the present disclosure and configurations illustrated in the drawings are simply the most preferred embodiment and do not represent all the technical sprites of the present invention, and it will be understood that various modifications and equivalents may be made to take the place of the embodiments at the time of filling the present application.

Hereinafter, preferred embodiments of the present invention will be described in detail with reference to the accompanying drawings. Herein, it should be noted that the same components are denoted by the same reference numerals in the accompanying drawings. In addition, detailed descriptions of well-known functions and configurations that may make the subject matter of the present invention rather unclear will not be described. For the same reason, in the accompanying drawings, some components are exaggerated, omitted, or schematically illustrated, and the size of each component does not entirely reflect the actual size.

In order to more clearly define the features and advantages of the means for solving the problem of the present invention, the present invention will be described in more detail with reference to specific embodiments of the present invention illustrated in the accompanying drawings.

However, in the following description and accompanying drawings, the publicly known functions and configurations that are judged to be able to make the purport of the present invention unnecessarily obscure will not be described. In addition, it should be noted that the same components are denoted by the same reference numerals throughout the accompanying drawings.

The terms and words used in the following description and drawings should not be construed as limited to a conventional or lexical meaning, and should be understood as appropriate notions by the inventor based on that he/she is able to define terms to describe his/her invention in the best way to be seen by others. Accordingly, embodiments described in the present disclosure and configurations illustrated in the drawings are simply the most preferred embodiment and do not represent all the technical sprites of the present invention, and it will be understood that various modifications and equivalents may be made to take the place of the embodiments at the time of filling the present application.

In addition, terms including ordinal numbers such as first, second, etc. are used to describe various components, and are used only for the purpose of distinguishing one component from other components, and are not used to limit the components. For example, a first component may also be named a second component without departing from the scope of the present invention, and likewise, the second component may also be named the first component.

In addition, when a component is referred to as being "connected" or "combined" to another component, it means that the component may be logically or physically connected or combined. In other words, it should be understood that the component may be directly connected or coupled to another component, but another component intervening therebetween may be present, and the component may be indirectly connected or coupled to the another component.

In addition, the terminology used in the present disclosure is for the purpose of describing particular embodiments only and is not intended to limit the present invention thereto. As used herein, the singular forms "a," "an" and "the" are intended to include the plural forms as well, unless the context clearly indicates otherwise. It should be further understood that the terms "comprises," "comprising," "includes" and/or "including," described in the present disclosure, specify the presence of stated features, integers, steps, operations, elements, components or a combination thereof, but do not preclude the presence or addition of one or more other features, integers, steps, operations, elements, components, or a combination thereof.

In addition, terms such as " . . . unit", " . . . group", and "module" described in the present disclosure mean a unit for processing at least one function or operation, which may be implemented as hardware or software or a combination of hardware and software.

In addition, as used herein the context for describing the present invention (particularly, in the context of the following claims), the singular forms "a," "an," "one" and "the" are intended to include the plural forms as well, unless the context clearly indicates otherwise in the present disclosure or is clearly limited by the context.

Further, embodiments within the scope of the present invention include a computer-readable medium having or carrying computer-executable instructions or data structures stored thereon. Such a computer-readable medium may be any available medium that can be accessed by a general purpose or special purpose computer system. By way of example, such a computer-readable medium may include RAM, ROM, EPROM, CD-ROM, or other optical disk storage device, magnetic disk storage device or other magnetic storage device, or a physical storage medium such as any other medium that can be used to store or transmit a predetermined program code means configured in the form of computer-executable instructions, computer-readable instructions or data structures, and that can be accessed by a general purpose or special purpose computer system, but it is not limited thereto. In the following description and claims, the computer-readable instructions include instructions and data that allow a general purpose computer system or special purpose computer system to perform a particular function or group of functions, for example. The computer-executable instructions may be, for example, binary, intermediate format instructions such as assembly language, or even source code.

Figure 4:
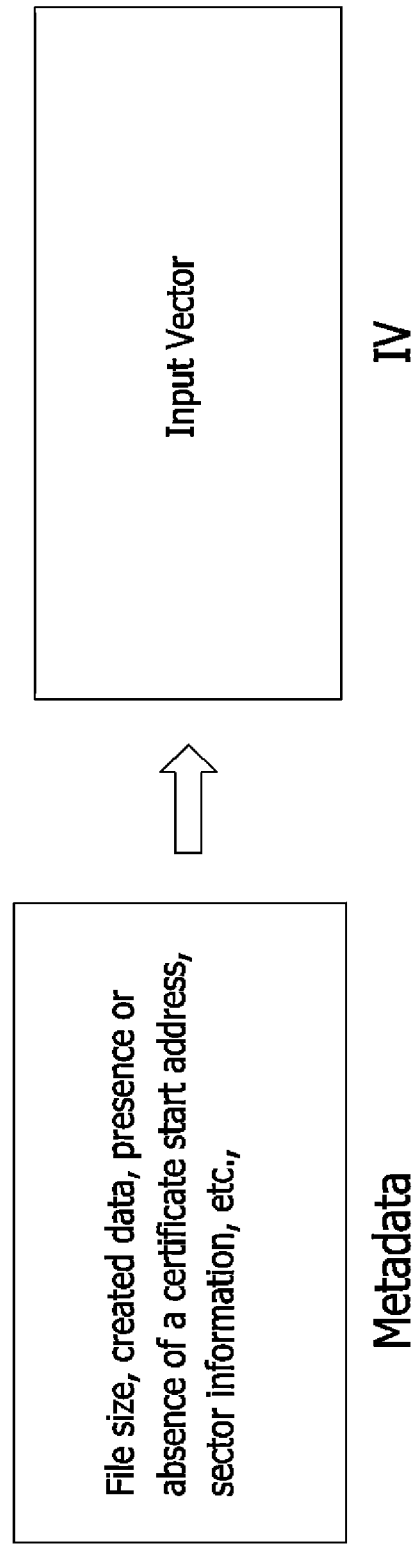
Figure 5:
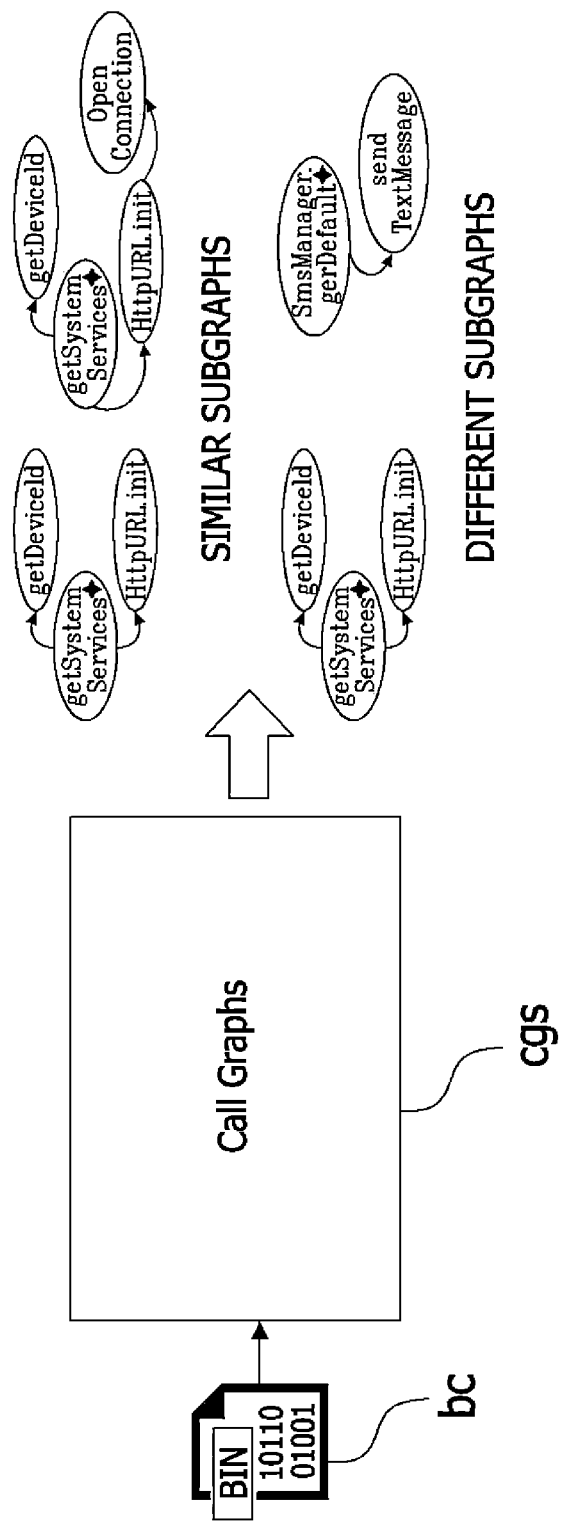
Figure 6:
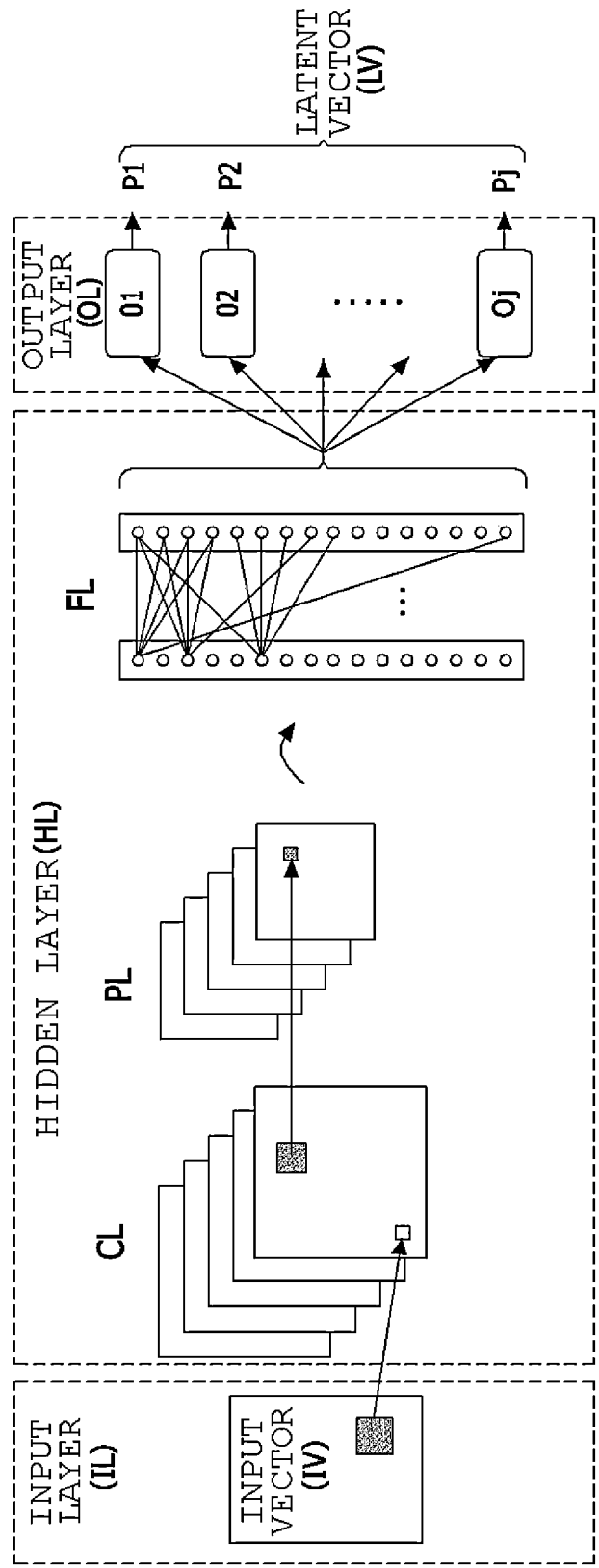
FIG. 6 is a view for describing a deep neural network model according to an embodiment of the present invention.
Figure 7A:
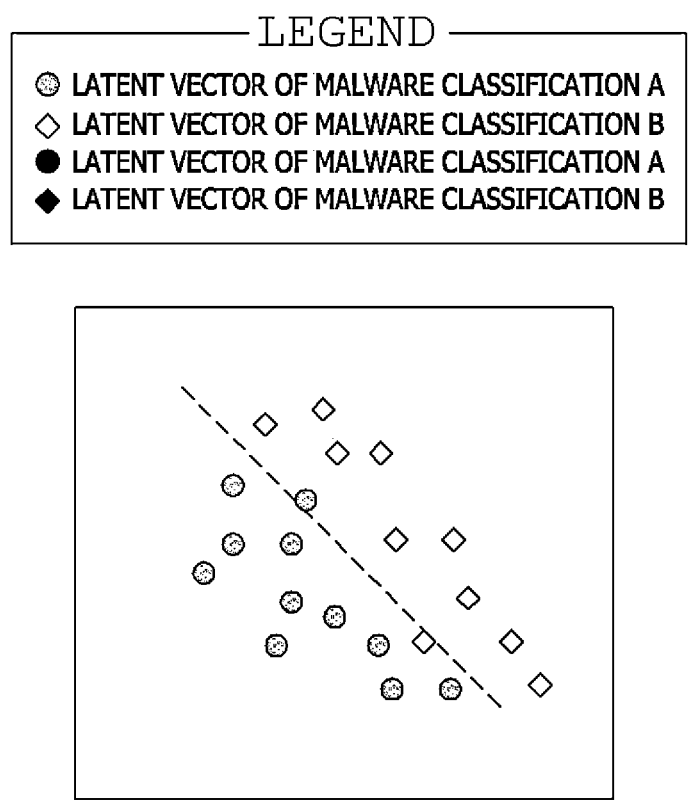
FIGS. 7A-7B are views for describing classification characteristics according to a learning method according to an embodiment of the present invention.
Figure 7B:
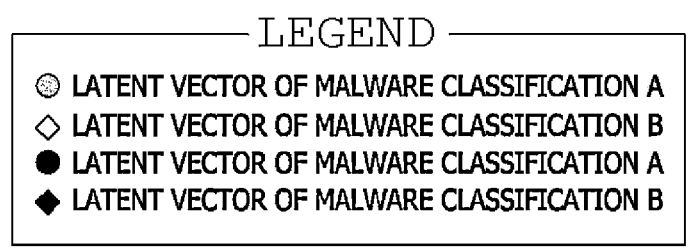
Figure 7B:
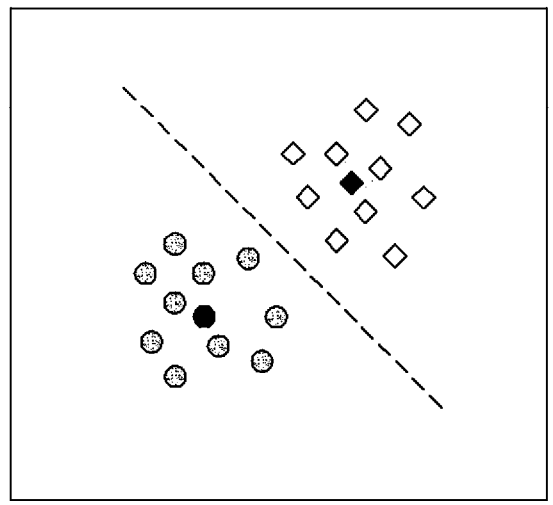

First, an apparatus for generating a signature that reflects the similarity of a deep neural network-based malware detection and classification system according to an embodiment of the present invention will be described. In the drawings, FIG. 1 is a block diagram for describing a configuration of an apparatus for generating a signature that reflects the similarity of a deep neural network-based malware detection and classification system according to an embodiment of the present invention, FIGS. 2 to 5 are views for describing a method for generating an input vector by embedding input information according to an embodiment of the present invention, FIG. 6 is a view for describing a deep neural network model according to an embodiment of the present invention, and FIGS. 7A-7B are views for describing classification characteristics according to a learning method according to an embodiment of the present invention.

Referring to FIG. 1, a signature generation apparatus 10 according to an embodiment of the present invention is configured to generate a signature for the malware classification using a deep neural network (DNN) model 210. The signature generation apparatus 10 includes a pre-processing unit 100, a classification unit 200, a learning unit 300, and a signature generation unit 400.

Figure 3:
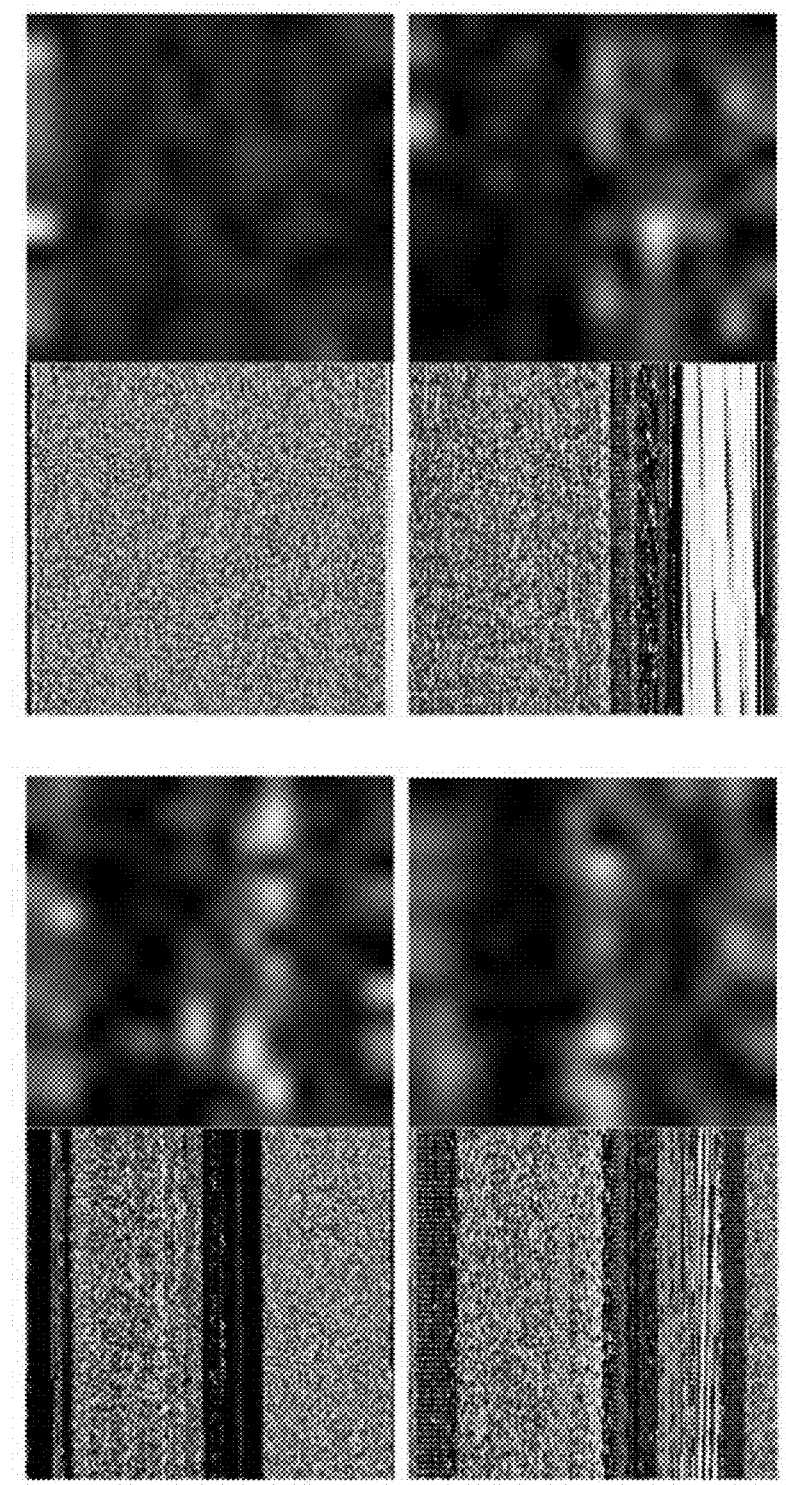

The pre-processing unit 100 is configured to generate an input vector (IV) to be transmitted to the deep neural network model 210 as an input. Information given to the deep neural network model 210 as an input may include binary codes of malwares or normal files, and metadata such as file sizes, entry points, and headers thereof, etc. The pre-processing unit 100 vectorizes information given as an input according to an input specification of the deep neural network model. That is, the pre-processing unit 100 may generate a learning input vector IV by embedding input information, which is information on a file whose malware classification is unknown, in a predetermined vector space, or may generate a learning input vector IV by embedding input information, which is information on a file whose malware classification is known, into the predetermined vector space. For example, referring to FIG. 2, the pre-processing unit 100 may generate the input vector IV by embedding an instruction sequence is and a byte sequence bs, which are present in a binary file bf whose malware classification is unknown or known. As another example, as shown in FIG. 3, the pre-processing unit 100 may generate a vector and use as the input vector IV by thumbnailing a malware executable file whose malware classification is unknown or known. As another example, as shown in FIG. 4, the pre-processing unit 100 may generate the input vector IV by embedding various metadata such as a file size, created date, presence or absence of a certificate, start address, sector information, etc., which can be obtained from a file whose malware classification is unknown or known. As another example, as shown in FIG. 5, the pre-processing unit 100 may generate the input vector IV by extracting call graphs cgs of functions from a binary code bc whose malware classification is unknown or known, and expressing functions composed of similar subgraphs as similar vectors based on the call relationship of the functions.

The classification unit 200 may basically execute the deep neural network model 210. The classification unit 200 may calculate a latent vector LV which indicates the similarity between at least one malware classification and the input vector IV by performing a plurality of computations to which learned weights w of a plurality of layers are applied on the input vector IV through the deep neural network model 210, and calculate output values from the latent vector.

The deep neural network model 210 includes a plurality of layers, and each of the plurality of layers includes a plurality of computations to which the weights are applied. Such the deep neural network model 210 includes an input layer IL, a hidden layer HL, and an output layer OL. The hidden layer HL may also include a plurality of layers. Examples of the deep neural network model 210 may include a convolutional neural network (CNN), a recurrent neural network (RNN), a long short term memory (LSTM) and the like.

As an example of the deep neural network model 210 according to embodiments of the present invention, FIG. 6 shows the convolutional neural network (CNN). The convolutional neural network (CNN) may also include an input layer IL, a hidden layer HL, and an output layer OL. The input vector IV generated by the pre-processing unit 100 is input into the input layer IL. Such the input vector IV is obtained by vectorization of input information such as a binary code of a malware or normal file, and metadata such as a file size, entry point, and header thereof, as a base of the input vector IV. Therefore, it is possible to deduce the malware classification to which the file as the base of the input vector IV belongs through an analysis of the input vector IV, while the input vector IV and the file as the base of the input vector IV maintain the identity.

The hidden layer HL of the convolutional neural network (CNN) includes at least one convolutional layer CL, at least one pooling layer PL, and at least one fully connected layer FL. The convolutional layer CL performs a convolution computation using a filter which is a matrix of the weights w, the pooling layer PL also performs a pooling (or sub-sampling) computation using the filter which is the matrix of the weights w, and the fully connected layer FL performs a computation by an activation function to which the weights are applied. Herein, examples of the activation function may include sigmoid, hyperbolic tangent (tanh), exponential linear unit (ELU), rectified linear unit (ReLU), Leakly ReLU, Maxout, Minout, Softmax and the like. The hidden layer HL of the convolutional neural network (CNN) performs a plurality of computations to which the weights are applied on the input vector IV. As described above, examples of the computation to which the weights are applied may include the convolution computation, the pooling (or sub sampling) computation, the computation using the activation function and the like. In particular, the outputs of the hidden layer HL become the latent vector LV. That is, when the last layer of the hidden layer HL is the fully connected layer FL, the latent vector LV may be a value obtained by connecting the output values of all nodes of the fully connected layer FL. For example, if the number of all nodes of the fully connected layer FL is x and the outputs of the x nodes are b1, b2, . . . and bx, the latent vector LV becomes [b1, b2, . . . and bx].

The output layer OL includes a plurality of output nodes O1 to Oy. Each of the plurality of output nodes O1 to Oy receives a value obtained by summing up all values multiplied by weights to the output values of each of the plurality of node values of the fully connected layer FL in the case of the last layer of the hidden layer HL, for example, the CNN. Then, each of the plurality of output nodes O1 to Oy calculates output values by performing a computation by the activation function on the input value. Each of the plurality of output nodes O1 to Oy corresponds to the malware classification. The output value of each of the plurality of output nodes O1 to Oy indicates the similarity between the malware classification corresponding to the output nodes O1 to Oy and the input vector IV. That is, the output value of each of the plurality of output nodes O1 to Oy indicates the probability that the file as the base of the input vector IV belongs to the malware classification corresponding to each of the plurality of output nodes O1 to Oy.

For example, it is assumed that the malware classification to be learned is APT, DDOS, RAT, Ransomware, Trojan, Worm and the like. Then, a first output node O1 may correspond to APT, a second output node O2 may correspond to DDOS, a third output node O3 may correspond to RAT, a fourth output node O4 may correspond to Ransomware, a fifth output node O5 may correspond to Trojan, and a sixth output node O6 may correspond to Worm. Thereby, an output value p1 of the first output node O1 indicates the similarity between the input vector IV and the APT, that is, the probability that the file as the base of the input vector IV is the APT. An output value p2 of the second output node O2 indicates the similarity between the input vector IV and the DDOS, that is, the probability that the file as the base of the input vector IV is the DDOS. An output value p3 of the third output node O3 indicates the similarity between the input vector IV and the RAT, that is, the probability that the file as the base of the input vector IV is the RAT. An output value p4 of the fourth output node O4 indicates the similarity between the input vector IV and the Ransomware, that is, the probability that the file as the base of the input vector IV is the Ransomware. An output value p5 of the fifth output node O5 indicates the similarity between the input vector IV and the Trojan, that is, the probability that the file as the base of the input vector IV is the Trojan. In addition, an output value p6 of the sixth output node O6 indicates the similarity between the input vector IV and the Worm, that is, the probability that the file as the base of the input vector IV is the Worm. For example, it is assumed that the output values p1, p2, p3, p4, p5 and p6 of each of the first to sixth output nodes O1 to O6 are [0.04, 0.77, 0.12, 0.04, 0.02 and 0.01]. Then, it indicates that the probability that the input vector IV is the APT is 4%, the probability that the input vector IV is the DDOS is 77%, the probability that the input vector IV is the RAT is 12%, the probability that the input vector IV is the Ransomware is 4%, the probability that the input vector IV is the Trojan is 2%, and the probability that the input vector IV is the Worm is 1%. Accordingly, it can be determined that the input vector IV belongs to the DDOS with the highest probability.

Again, referring to FIG. 1, the learning unit 300 is configured to cause the deep neural network model 210 to perform learning. The learning unit 300 includes a classification learning unit 310, a distance function learning unit 320, and a binarization learning unit 330.

The classification learning unit 310 is configured to cause the deep neural network model 210 to perform learning so as to deduce a malware classification to which the input vector IV belongs through a computation on the input vector IV. That is, the classification learning unit 310 causes the deep neural network model 210 to perform learning so that the latent vector LV calculated by the same indicates the malware classification of the input vector IV. The pre-processing unit 100 may generate the learning input vector IV by embedding input information, which is information on a file whose malware classification is known, in the predetermined vector space. Then, the classification learning unit 310 sets an expected value for the learning input vector whose malware classification is known according to the known malware classification. For example, it is assumed that there are only six malware classifications intended to learn including APT, DDOS, RAT, Ransomware, Trojan, and Worm. Then, according to the known malware classification of the learning input vector IV, the classification learning unit 310 may set the expected value for the output values calculated by the deep neural network model 210 as a one-hot vector through one-hot encoding as shown in Table 1 below.

TABLE 1

| Known malware classification of learning | Expected value (classification vector) | | | | | |
|---|---|---|---|---|---|---|
| input vector IV | O1 | O2 | O3 | O4 | O5 | O6 |
| APT | 1 | 0 | 0 | 0 | 0 | 0 |
| DDOS | 0 | 1 | 0 | 0 | 0 | 0 |
| RAT | 0 | 0 | 1 | 0 | 0 | 0 |
| Ransomware | 0 | 0 | 0 | 1 | 0 | 0 |
| Trojan | 0 | 0 | 0 | 0 | 1 | 0 |
| Worm | 0 | 0 | 0 | 0 | 0 | 1 |

After setting the expected value as shown in Table 1, the classification learning unit 310 inputs the learning input vector IV into the deep neural network model 210. Then, the deep neural network model 210 performs a plurality of computations to which unlearned weights w are applied on the learning input vector IV, such that the output values p1, p2, p3, p4, p5 and p6 of the output nodes O1 to O6 which indicate the similarity between at least one malware classification and the input vector IV may be calculated. Thereafter, the classification learning unit 310 causes the deep neural network model 210 to perform weight learning to correct the weights w thereof, so as to minimize a difference between the output values p1, p2, p3, p4, p5 and p6 calculated by the deep neural network model 210 and the expected values (Table 1) set according to the known malware classification. A backpropagation algorithm may be applied for performing such weight learning. In this way, as shown in Table 1, the classification learning unit 310 causes the deep neural network model 210 to perform weight learning by setting the expected value using the one-hot vector through one-hot encoding, such that the deep neural network model 210 may be subjected to learning by distinguishing the characteristics of different malwares.

The distance function learning unit 320 is configured to, when the latent vector LV calculated through the computation on the input vector IV is calculated by the deep neural network model 210, cause the deep neural network model 210 to perform learning so that the Euclidean distance between the latent vectors (LVs) of the malwares belonging to the same classification in the vector space is decreased. The pre-processing unit 100 may generate the learning input vector IV by embedding input information, which is information on a file whose malware classification is known, in the predetermined vector space. Then, the distance function learning unit 320 sets a center vector CV of the known malware classification for the learning input vector IV whose malware classification is known as an expected value for the latent vector LV calculated by the deep neural network model 210. The center vector CV is a vector embedded in the same vector space as the latent vector LV, and the center vector CV is preset according to the malware classification. When setting the center vector CV, in order to reduce an influence on the classification and search of different malwares, the distance between the respective center vectors CV is set so as to be spaced apart from each other by the preset Euclidean distance or more in the vector space. In addition, the center vector CV may fixedly use a preset value, and the center vector CV may also be updated in a direction in which the latent vector LV of the malware is located in the learning process, so that the distance between the latent vector LV and the center vector CV is minimized.

After setting the expected value, the distance function learning unit 320 inputs the learning input vector IV into the deep neural network model 210. Then, the deep neural network model 210 may calculate the latent vector LV which indicates the similarity between at least one malware classification and the input vector IV by performing a plurality of computations to which the unlearned weights w are applied on the learning input vector IV. Thereafter, the distance function learning unit 320 causes the deep neural network model 210 to perform weight learning to correct the weights w thereof, so that the distance between the latent vector LV calculated by the deep neural network model 210 and the center vector (CV) of the known malware classification as the expected value in the vector space, is minimized. In this case, the distance function learning unit 320 corrects the weights of the deep neural network model 210, so that a computation result value of an objective function is minimized as shown in Equation 1 below.

$$L_c = \lambda \frac{1}{N} \sum_i (c_{yi} - e_i)^2 \quad \text{[Equation 1]}$$

Wherein, Lc is an objective function which allows the distance between the latent vector and the center vector to be minimized, and λ is a ratio in which the computation result value of the objective function of the distance function learning unit is reflected in weight learning of the deep neural network model. In addition, N is the number of learning input vectors, wherein i denotes the i-th among first to N-th learning input vectors, $C_{yi}$ is a center vector of the malware classification of the i-th learning input vector, and $e_i$ denotes a latent vector of the i-th learning input vector.

An image of FIG. 7A illustrates a distribution of the latent vectors LVs when the deep neural network model 210 is not subjected to learning of the weights w, so that the distance in the vector space is minimized, and an image of FIG. 7B illustrates a distribution of the latent vectors LVs when the deep neural network model 210 is subjected to learning of the weights w, so that the distance in the vector space is minimized. In the case in FIGS. 7A-7B, it is only possible to simply classify the malware to which the latent vector LV belongs, and the similarity between the malwares, for example, the distance in the vector space, cannot be indicated. However, when the deep neural network model 210 is subjected to learning of the weights w, so that the distance in the vector space is minimized by the distance function learning unit 320, it is possible to indicate the similarity based on the center vector CV of each malware classification, and the performance of classification between malware classifications is also improved.

That is, if only weight learning is performed by setting the expected value using the one-hot vector through one-hot encoding by the classification learning unit 310, the latent vector LV, which is computation results of the deep neural network model 210, can distinguish different malwares. However, since the one-hot vector through one-hot encoding is used, information on an extent of the actual similarity cannot be provided. Therefore, as the deep neural network model 210 is subjected to learning the distance between a plurality of center vectors which represent each of different malwares through the distance function learning unit 320, the latent vector calculated by the deep neural network model 210 may have not only information for distinguishing the malware but also information on the similarity which indicates that it is similar to what malware to what extent.

The binarization learning unit 330 is configured to cause the deep neural network model 210 to perform learning, so that a value of each element of the latent vector LV is binarized based on a predetermined reference value. That is, even if each element forming the latent vector LV is quantized to have a value of 1 or 0, the binarization learning unit 330 is intended to decrease the distance between the latent vectors LVs, while the distance between the center vectors CVs of the same malware classification is minimized. The pre-processing unit 100 generates the learning input vector IV by embedding input information, which is information on a file whose malware classification is known, in the predetermined vector space. Then, the binarization learning unit 330 sets the expected value for the latent vector LV calculated by the deep neural network model 210 using a reference value $k_1$, which is the reference for binarization, and a separation value $k_2$, which determines the extent of separation from the reference value, for the learning input vector IV whose malware classification is known. That is, the expected value is set as a value obtained by adding the separation value to the reference value ($k_1+k_2$) or a value obtained by subtracting the separation value from the reference value ($k_1-k_2$). After setting the expected value, the binarization learning unit 330 inputs the learning input vector IV into the deep neural network model 210. Then, the deep neural network model 210 may calculate the latent vector LV which indicates the similarity between at least one malware classification and the input vector IV by performing a plurality of computations to which the unlearned weights w are applied on the learning input vector IV. Thereafter, the binarization learning unit 330 causes the deep neural network model 210 to perform weight learning to correct the weights w thereof, so that the difference between the value of each element of the latent vector LV and the expected value ($k_1+k_2$ or $k_1-k_2$) is minimized. In other words, the binarization learning unit 330 corrects the weights w of the deep neural network model 210, so that the value of each element of the latent vector LV calculated by the deep neural network model 210 is binarized close to the value ($k_1+k_2$) obtained by adding the separation value to the reference value or the value ($k_1-k_2$) obtained by subtracting the separation value from the reference value.

In this case, the binarization learning unit 330 may correct the weights of the deep neural network model 210 so that the computation result value of the objective function is minimized as shown in Equation 2 below.

$$L_b = \eta \sum_i^N \sum_j^M ||b_{ij} - k_1| - k_2| \qquad \text{[Equation 2]}$$

Wherein, Lb is an objective function which allows a value of the latent vector to be binarized into $k_1+k_2$ and $k_1-k_2$, and η is a ratio in which the computation result value of the objective function is reflected in weight learning. In addition, N is the number of learning input vectors, M is a length of the latent vector, i denotes the i-th among first to N-th learning input vectors, and j denotes the j-th element among first to M-th elements of the latent vector. Further, $b_{ij}$ denotes a value of the j-th element of the latent vector of the i-th learning input vector, $k_1$ is the reference value, and $k_2$ denotes the separation value. Wherein, $k_1$ and $k_2$ are positive real numbers.

When only the weight learning is performed by the classification learning unit 310 and the distance function learning unit 320, the latent vector LV, which is the computation results of the deep neural network model 210, has classification information and similarity information for each of the plurality of malwares. However, since the distribution of the values is not normalized, a subsequent computation on the latent vector LV is not easily performed. For example, assuming that the latent vector LV is a vector having a length of three (3), each element of the latent vector LV may be output as [249050.0, −0.10688, 0.0001667]. In this case, too much memory is consumed in a subsequent computing process due to different scales. However, according to the present invention, since the binarization learning unit 330 causes the deep neural network model 210 to perform learning so that the value of the latent vector is binarized through the predetermined reference value $k_1$ and the separation value $k_2$ as shown in Equation 2, each element of the latent vector LV is not output as [249050.0, −0.10688, 0.0001667], but as [0.4981, −0.5344, 0.5001]. As such, values of all elements of the latent vector LV are normalized within a predetermined range through learning by the binarization learning unit 330, thereby it is advantageous for the subsequent computing process on the latent vector LV. Furthermore, in the general case, if the value of each element of the vector is less than 0, it was quantized to 0, and if the value thereof is 0 or more, it was quantized to 1, thus to generate a signature. However, according to the embodiment of the present invention, through the learning of the binarization learning unit 330, if the value of each element of the latent vector LV is less than the reference value $k_1$, it may be quantized to 0, and if the value thereof is greater than the reference value $k_1$, it may be quantized to 1.

Again, referring to FIG. 1, the signature generation unit 400 generates a signature of the malware in the form of a binary vector by quantizing the latent vector LV output by the classification unit 200. For example, it is assumed that the reference value $k_1$ is 0 and the separation value $k_2$ is 0.5. Then, the value of each element of the latent vector LV after being subjected to learning by the binarization learning unit 330 is output as a value near 0.5 or −0.5, as in the above-described example, as [0.4981, −0.5344, 0.5001], such that there is no advantage in terms of data storage or transfer, etc. Accordingly, it is preferable to reduce the number of bits used to represent data by quantizing such the latent vector LV and changing it to a value of 1 or 0. For example, the signature generation unit 400 may generate a signature vector [1, 0, 1] of the malware in the form of a binary vector by quantizing the latent vector [0.4981, −0.5344, 0.5001]. Accordingly, since a value can be represented using only 1 bit for each element of the vector, it is advantageous in terms of information storage and transfer.

Figure 8:
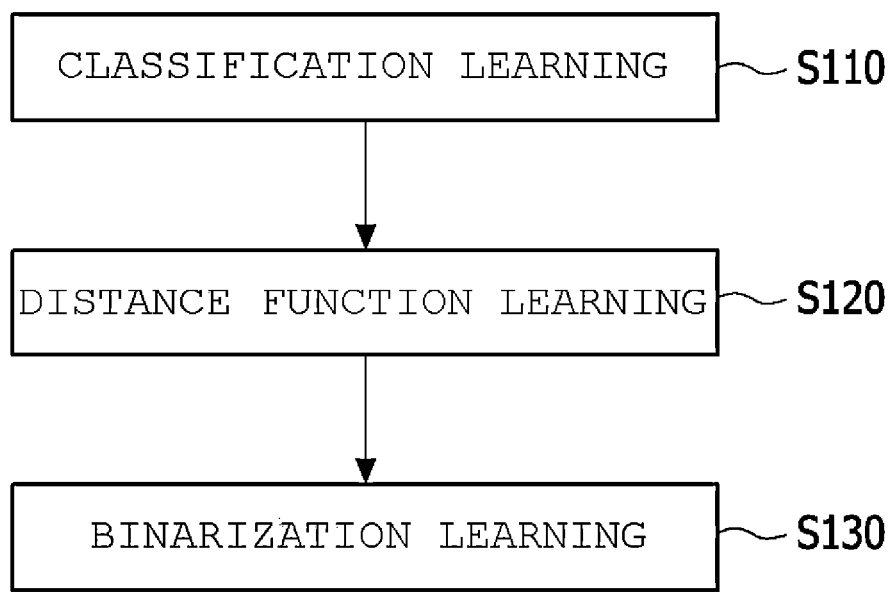
FIG. 8 is a flowchart for describing a method for causing the deep neural network model to perform learning according to an embodiment of the present invention.

Next, a method for generating a signature that reflects the similarity of a deep neural network-based malware detection and classification system will be described. Prior to describing the method for generating a signature, a method for causing the deep neural network model to perform learning will be described. FIG. 8 is a flowchart for describing a method for causing the deep neural network model to perform learning according to an embodiment of the present invention.

Referring to FIG. 8, the classification learning unit 310 of the learning unit 300 performs classification learning in step S110. That is, when a learning input vector IV whose malware classification is known is input into the deep neural network model 210, and a latent vector is calculated by the deep neural network model 210 by performing a plurality of computations to which the unlearned weights w are applied on the learning input vector IV, the classification learning unit 310 causes the deep neural network model 210 to perform learning to correct the weights w thereof, so that a difference between the latent vector calculated by the deep neural network model 210 and the expected value set according to the known malware classification is minimized.

When the classification learning caused by the classification learning unit 310 is completed, the distance function learning unit 320 of the learning unit 300 performs distance function learning in step S120. That is, in the distance function learning unit 320, when the learning input vector IV whose malware classification is known is input into the deep neural network model 210, and a latent vector LV is calculated by the deep neural network model 210 by performing a plurality of computations to which the unlearned weights w are applied on the learning input vector IV, the distance function learning unit 320 causes the deep neural network model 210 to perform learning to correct the weights w thereof, so that a difference between the calculated latent vector LV and the center vector CV of the known malware classification as the expected value in the vector space, is minimized according to Equation 1.

When the distance function learning caused by the distance function learning unit 320 is completed, the binarization learning unit 330 of the learning unit 300 performs binarization learning in step S130. That is, in the binarization learning unit 330, when the learning input vector IV whose malware classification is unknown is input into the deep neural network model 210, and a latent vector LV is calculated by the deep neural network model 210 by performing a plurality of computations to which the unlearned weights w are applied on the learning input vector IV, the binarization learning unit 330 causes the deep neural network model 210 to perform learning to correct the weights w thereof, so that a difference between the value of each element of the latent vector LV and the expected value ($k_1+k_2$ or $k_1-k_2$) is minimized according to Equation 2.

Figure 9:
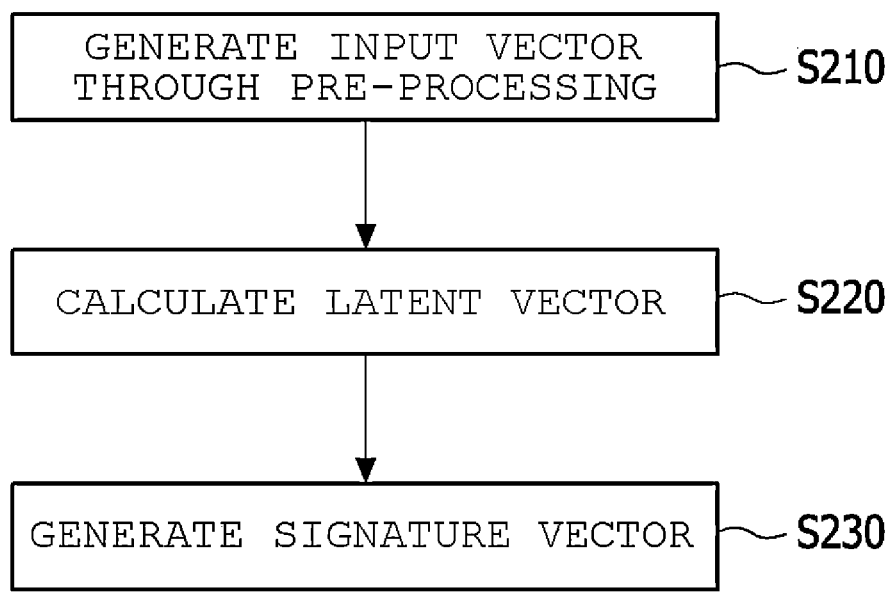
FIG. 9 is a flowchart for describing a method for generating a signature that reflects the similarity of a deep neural network-based malware detection and classification system according to an embodiment of the present invention.

When the binarization learning is completed as described above, the method for generating a signature that reflects the similarity of a deep neural network-based malware detection and classification system according to the embodiment of the present invention may be performed according to the learned weight w. FIG. 9 is a flowchart for describing a method for generating a signature that reflects the similarity of a deep neural network-based malware detection and classification system according to an embodiment of the present invention.

Referring to FIG. 9, the pre-processing unit 100 generates an input vector IV by embedding input information, which is information on a file whose malware classification is unknown, in a predetermined vector space in step S210. Herein, the input information may include binary codes of malwares or normal files, and metadata such as file sizes, entry points, and headers thereof, etc.

Next, from the input vector IV input from the pre-processing unit 100, the classification unit 200 calculates the latent vector LV which indicates the similarity between at least one malware classification and the input vector IV in step S220. In this case, the classification unit 200 calculates the latent vector which indicates the similarity between the at least one malware classification and the input vector by performing a plurality of computations to which learned weights w of a plurality of layers are applied on the input vector IV through the deep neural network model 210.

Next, the signature generation unit 400 generates a signature vector of the malware in the form of a binary vector by quantizing the latent vector LV in step S230.

According to the present invention as described above, the deep neural network model 210 subjected to learning by the classification learning unit 310 and the distance function learning unit 320 may generate the latent vector LV for an arbitrary input vector IV so that it is brought close to the center vector CV of the same malware classification. Therefore, it can be determined that the latent vector LV deduced from the arbitrary input vector IV has the same malware classification as the latent vectors LVs having the Euclidean distance decreased less than a predetermined distance. For example, when a malware sample Q was given, if a plurality of latent vectors within a predetermined distance from the latent vector VQ for the sample Q are extracted, it can be determined that the latent vector VQ for the sample Q belongs to the same malware classification as the extracted latent vector.

Furthermore, when a certain malware sample whose malware classification is unknown was given, samples having the most similar characteristics to the malware may be provided in the order of the distance between the same and the latent vector LV. For example, when three malware samples which are the most similar to A.exe are requested, B.exe, C.exe, and D.exe may be returned in the order of the closest distance between the A.exe and latent vector LV among the pre-learned malware samples.

The above-described classification method may be equally applied to the signature vector. It is assumed that the latent vector LV, which is the output of the deep neural network model 210 for the input vector IV whose malware classification is unknown, is [0.4922, −0.5201, −0.471, 0.5113, 0.503]. A signature vector obtained by binarizing such the latent vector LV is [1, 0, 0, 1, 1], which is referred to as a target signature vector. In this case, a distance between the target signature vector and a plurality of previously stored signature vectors in the vector space is calculated. In addition, a malware classification to which the largest number of signature vectors among one or more signature vectors having the closest distance between the same and the target signature vector belongs may be determined to be the malware classification of the target signature vector.

For example, it is assumed that a database in which the existing malware signature vectors are stored is shown in Table 2 below.

TABLE 2

[1, 0, 0, 1, 1]: Trojan
[0, 0, 0, 1, 1]: APT
[1, 0, 1, 0, 1]: Worm
[1, 1, 0, 1, 1]: Trojan
[1, 0, 0, 1, 1]: Worm
[1, 0, 0, 1, 1]: Worm
[0, 0, 0, 1, 1]: APT
[1, 0, 0, 1, 1]: Trojan
[1, 0, 0, 1, 0]: Trojan
[1, 0, 1, 0, 1]: Worm
[1, 0, 0, 1, 1]: Trojan
[1, 0, 1, 1, 1]: Trojan
. . .

In this case, when the distance between the target signature vector and the plurality of previously stored signature vectors in the vector space is calculated, the calculated results may be arranged as shown in Table 3 below.

TABLE 3

|  | Trojan | Worm | APT |
| --- | --- | --- | --- |
| [1, 0, 0, 1, 1] | 4 | 2 | 1 |
| [1, 0, 1, 0, 1] | 0 | 2 | 0 |
| [0, 0, 0, 1, 1] | 1 | 0 | 1 |
| [1, 0, 1, 1, 1] | 1 | 0 | 0 |

According to the malware classification of the signature vector closest to the target signature vector [1, 0, 0, 1, 1] (distance 0), there are 4 Trojans, 2 Worms, and 1 APT. Thereby, the malware classification of the target signature vector [1, 0, 0, 1, 1] may be determined to be Trojan.

In addition, when a certain malware sample whose malware classification is unknown was given, samples having the most similar characteristics to the corresponding malware may be provided in the order of the distance between the same and the signature vector. For example, when three malware samples are the most similar to A.exe are requested, B.exe, C.exe, and D.exe may be returned in the order of the closest distance between the A.exe and the signature vector among the pre-learned malware samples.

According to the prior art, after extracting a plurality of signatures from learning data, a section and a frequency are set according to the importance for each signature, and malwares are classified through signatures with high importance. That is, in the prior art, in order to extract a signature with high importance, after executing the learning data, the signature is extracted through behavioral observation. On the other hand, in the present invention, the behavioral observation is not required in extracting the signature of the malware, and the latent vectors generated for the malware are also grouped by the same malware classification, such that classification accuracy may be improved.

Meanwhile, the above-described method according to the embodiment of the present invention may be implemented in a program command form which may be performed through various means for processing information to be recorded in a storage medium. Herein, the storage medium may include program commands, data files, data structures, and the like alone or in combination thereof. The program command recorded in the storage medium may be specially designed and configured for the present invention, or may be publicly known to and used by those skilled in the software field. Examples of the storage medium include magnetic media such as a hard disk, a floppy disk, and a magnetic tape, optical media such as a CD-ROM and a DVD, magneto-optical media such as a floptical disk, and a hardware device which is specifically configured to store and examples of the program command such as a ROM, a RAM, a flash memory and the like. An example of the program command includes a high-level language code executable by a device electrically processing information, for example, a computer by using an interpreter, and the like, as well as a machine language code generated by a compiler.

As described above, while the present disclosure includes numerous details of specific implementation, it should be understood that these are not limited to the scope of any invention or range to be claimed, but rather they are descriptions for characteristics specific to particular embodiments of a particular invention. Certain characteristics which are described in the present disclosure in the context of separate embodiments may be implemented in combination in a single embodiment. Conversely, various characteristics which are described in the context of a single embodiment may also be implemented in multiple embodiments, either individually or in any suitable sub-combination. Furthermore, although characteristics may be incorporated in a particular combination and may be depicted as initially claimed as such, one or more characteristics from a claimed combination may be excluded from the combination in some cases, and the claimed combination may be altered to a sub-combination or a variant of the sub-combination.

The embodiments of the present invention present the best mode of the present invention, and provide examples to illustrate the present invention and to enable any of those skilled in the art to make or use the present invention. The specification prepared as such does not limit the present invention to the specific presented terms. Accordingly, while the present invention has been described in detail with reference to the above-described examples, it will be understood by those skilled in the art that various modifications and variations of the examples may be made without departing from the scope of the present invention. Accordingly, the scope of the present invention should not be defined by the described embodiments, but should be defined by the claims.

DESCRIPTION OF REFERENCE NUMERALS

100: Pre-processing unit
200: Classification unit
300: Learning unit
310: Classification learning unit
320: Distance function learning unit
330: Binarization learning unit
400: Signature generation unit

What is claimed is:

1. An apparatus for generating a signature that reflects the similarity of a malware detection and classification system, the apparatus comprising: a pre-processing unit configured to generate an input vector from input information which is information on a file whose malware classification is unknown; a classification unit configured to calculate a latent vector which indicates the similarity between at least one malware classification and the input vector by performing a plurality of computations to which learned weights of a plurality of layers are applied on the input vector through a deep neural network model; and a signature generation unit configured to generate a signature of the malware in a form of a binary vector by quantizing the latent vector, wherein the quantizing includes: setting an expected value for a learning input vector of a known malware classification; calculating a latent vector which indicates the similarity between the malware classification and the input vector; applying unlearned weights to the learning input vector and correcting the weights so that the expected value is minimized using the equation:

$$L_b = \eta \sum_i^N \sum_j^M ||b_{ij} - k_1| - k_2|$$

wherein, Lb is an objective function which allows a value of the latent vector to be binarized (to be brought close to ki+k2 or ki−k2), i is a ratio in which the computation result value of the objective function is reflected in weight learning, N is the number of learning input vectors, M is a length of the latent vector, i denotes the i-th among first to N-th learning input vectors, j denotes the j-th element among first to M-th elements of the latent vector, bi is a value of the j-th element of the latent vector of the i-th learning input vector, ki is the reference value, and k2 is the separation value.

2. The apparatus according to claim 1, further comprising a classification learning unit configured to: set an expected value for a learning input vector whose malware classification is known according to the known malware classification; input the learning input vector into the deep neural network model; and when the deep neural network model calculates an output value which indicates the similarity between at least one malware classification and the input vector by performing a plurality of computations to which unlearned weights are applied on the learning input vector, correct the weights of the deep neural network model so that a difference between the calculated output value and the expected value set according to the known malware classification is minimized.

3. The apparatus according to claim 1, further comprising a distance function learning unit configured to: set a center vector of the known malware classification as an expected value for a learning input vector whose malware classification is known; input the learning input vector into the deep neural network model; and when the deep neural network model calculates a latent vector which indicates the similarity between at least one malware classification and the input vector by performing a plurality of computations to which unlearned weights are applied on the learning input vector, correct the weights of the deep neural network model so that a distance between the calculated latent vector and the center vector of the known malware classification is minimized.

4. The apparatus according to claim 3, wherein the distance function learning unit corrects the weights of the deep neural network model, so that a computation result value of an objective function is minimized as shown in Equation 1 below:

$$L_c = \lambda \frac{1}{N} \sum_i (c_{yi} - e_i)^2 \quad \text{[Equation 1]}$$

wherein, Lc is an objective function which allows the distance between the latent vector and the center vector to be minimized, X is a ratio in which the computation result value of the objective function of the distance function learning unit is reflected in weight learning of the deep neural network model, N is the number of learning input vectors, i denotes the i-th among first to N-th learning input vectors, Cyi is a center vector of the malware classification of the i-th learning input vector, and ei is a latent vector of the i-th learning input vector.

5. A method for generating a signature that reflects the similarity of a malware detection and classification system, the method comprising the steps of: generating, by a pre-processing unit, an input vector from input information which is information on a file whose malware classification is unknown; calculating, by a classification unit, a latent vector which indicates the similarity between at least one malware classification and the input vector by performing a plurality of computations to which learned weights of a plurality of layers are applied on the input vector through a deep neural network model; and generating, by a signature generation unit, a signature vector of a malware in a form of a binary vector by quantizing the latent vector, wherein the quantizing includes: setting an expected value for a learning input vector of a known malware classification; calculating a latent vector which indicates the similarity between the malware classification and the input vector; applying unlearned weights to the learning input vector and correcting the weights so that the expected value is minimized using the equation:

$$L_b = \eta \sum_i^N \sum_j^M ||b_{ij} - k_1| - k_2|$$

wherein, Lb is an objective function which allows a value of the latent vector to be binarized (to be brought close to ki+k2 or ki−k2), i is a ratio in which the computation result value of the objective function is reflected in weight learning, N is the number of learning input vectors, M is a length of the latent vector, i denotes the i-th among first to N-th learning input vectors, j denotes the j-th element among first to M-th elements of the latent vector, bi is a value of the j-th element of the latent vector of the i-th learning input vector, ki is the reference value, and k2 is the separation value.

6. The method according to claim 5, before the step of generating the input vector, further comprising a classification learning step comprising the steps of: generating, by the pre-processing unit, a learning input vector whose malware classification is known; setting, by a classification learning unit, an expected value for the learning input vector according to the known malware classification; inputting, by the classification learning unit, the learning input vector into the deep neural network model; calculating, by the deep neural network model of the classification unit, an output value which indicates the similarity between at least one malware classification and the input vector by performing a plurality of computations to which unlearned weights are applied on the learning input vector; and correcting, by the classification learning unit, the weights of the deep neural network model so that a difference between the calculated output value and the expected value set according to the known malware classification is minimized.

7. The method according to claim 6, before the step of generating the input vector, and after the classification learning step, further comprising a distance function learning step comprising the steps of setting, by a distance function learning unit, a center vector of the known malware classification as an expected value for a learning input vector whose malware classification is known; inputting, by the distance function learning unit, the learning input vector into the deep neural network model; calculating, by the deep neural network model of the classification unit, a latent vector which indicates the similarity between at least one malware classification and the input vector by performing a plurality of computations to which unlearned weights are applied on the learning input vector; and correcting, by the distance function learning unit, the weights of the deep neural network model so that a distance between the calculated latent vector and the center vector of the known malware classification in a vector space is minimized.

8. The method according to claim 7, wherein the distance function learning step comprises: correcting, by the distance function learning unit, the weights of the deep neural network model, so that a computation result value of an objective function is minimized as shown in Equation 1 below:

$$L_c = \lambda \frac{1}{N} \sum_i (c_{yi} - e_i)^2 \quad \text{[Equation 1]}$$

wherein, Lc is an objective function which allows the distance between the latent vector and the center vector to be minimized, X is a ratio in which the computation result value of the objective function of the distance function learning unit is reflected in weight learning of the deep neural network model, N is the number of learning input vectors, i denotes the i-th among first to N-th learning input vectors, Cyi is a center vector of the malware classification of the i-th learning input vector, and ei is a latent vector of the i-th learning input vector.

9. A computer-readable recording medium in which a program for performing the method for generating a signature according to claim 5 in a computer is recorded.

* * * * *